April 15, 1969     E. C. BARBERA     3,438,419
PUNCTURE RESISTANT INFLATABLE ARTICLES
Filed Nov. 10, 1966     Sheet 1 of 4
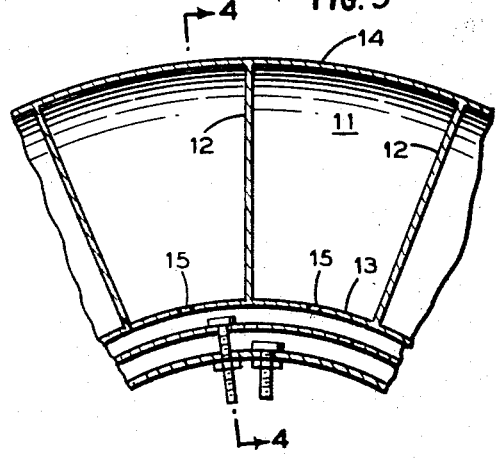
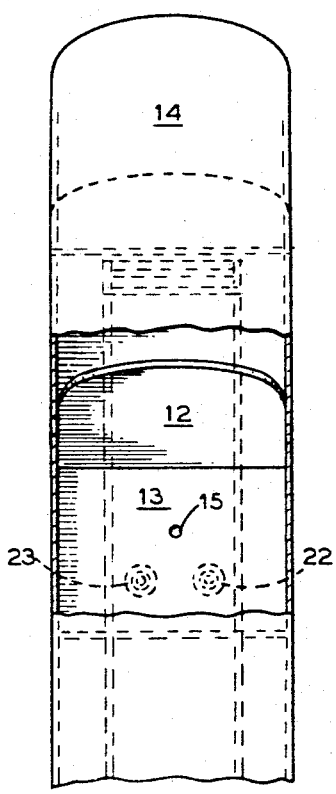
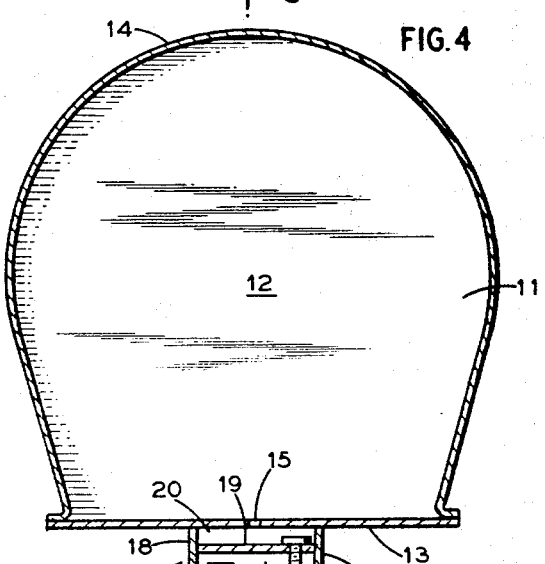
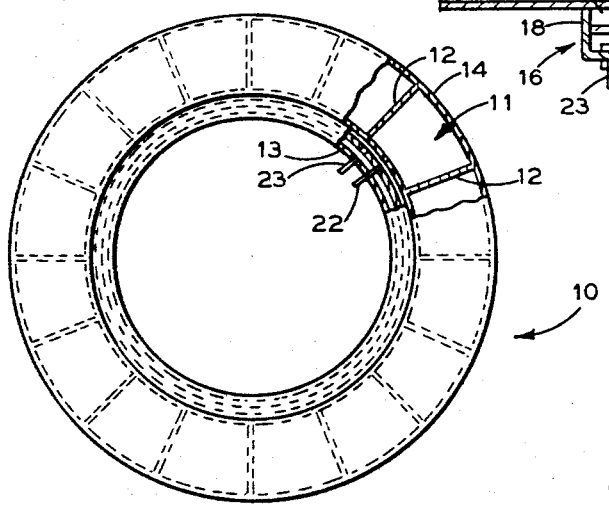
INVENTOR.
Edmund C. Barbera
BY
ATTORNEY

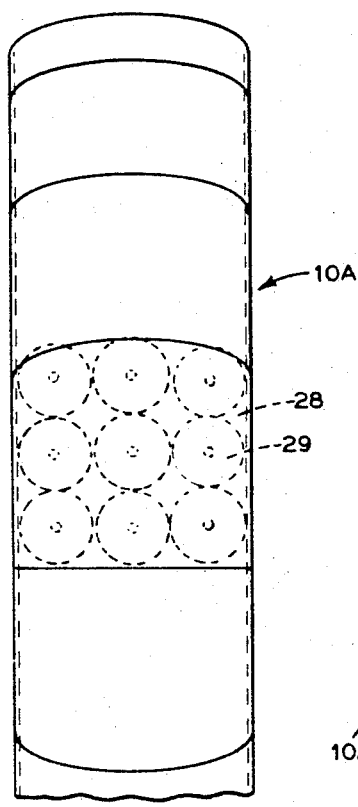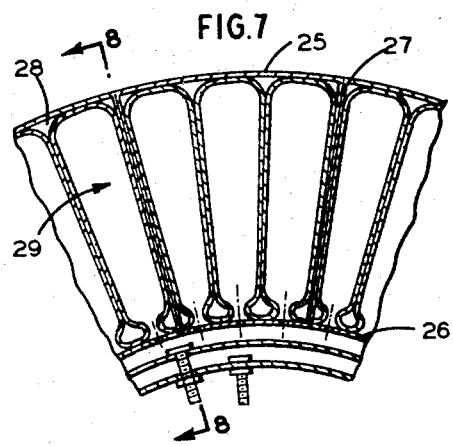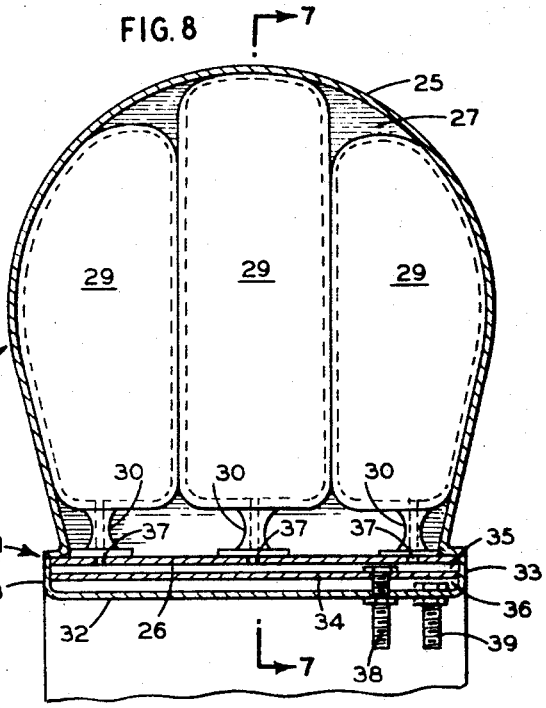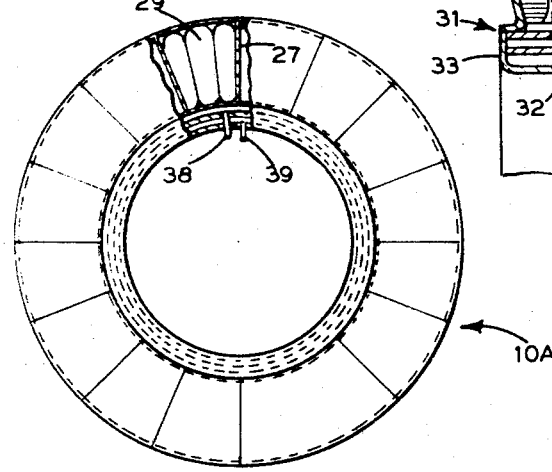

April 15, 1969  E. C. BARBERA  3,438,419
PUNCTURE RESISTANT INFLATABLE ARTICLES
Filed Nov. 10, 1966　　　　　　　　　　　　　　Sheet 3 of 4
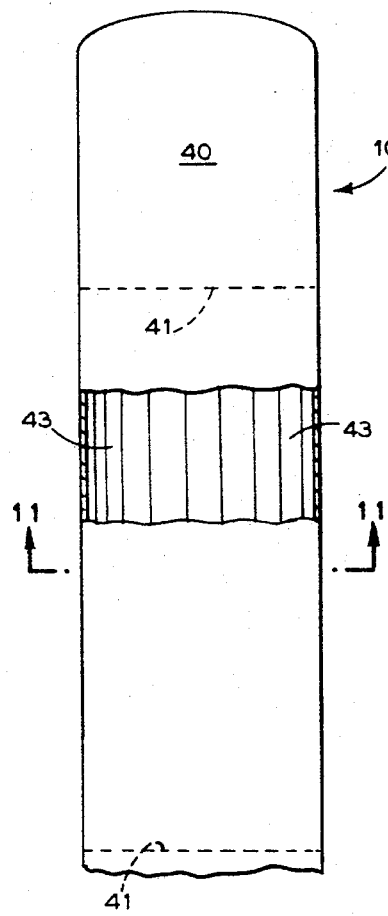
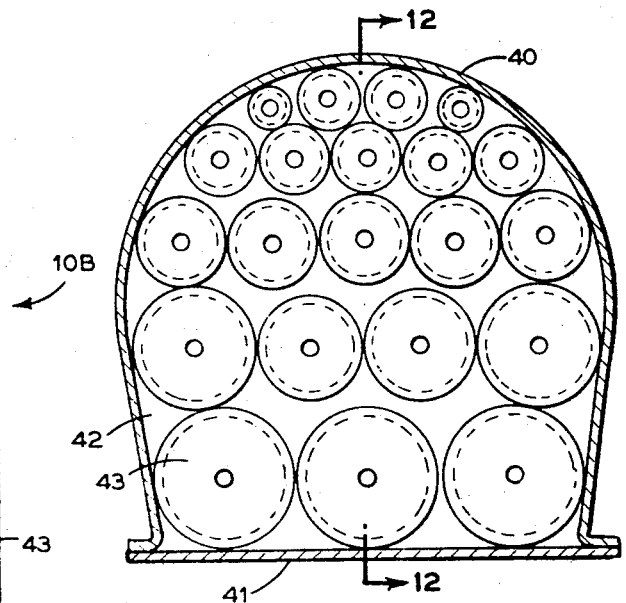
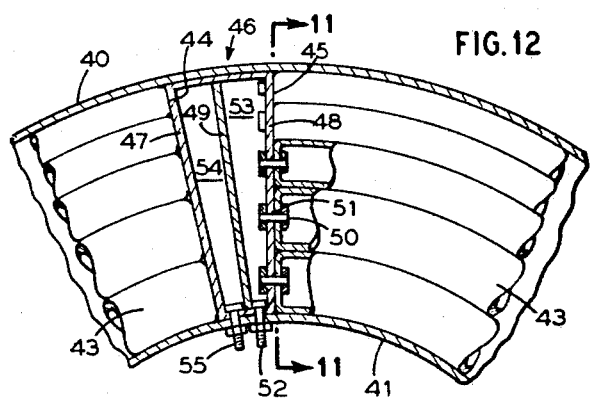
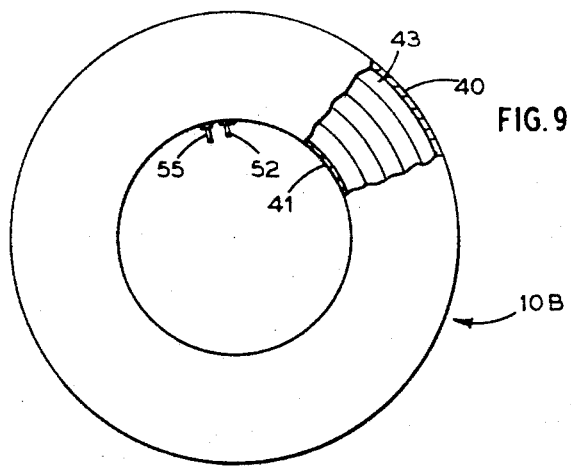

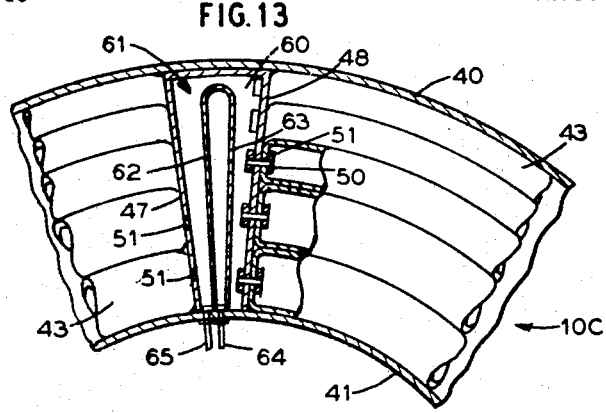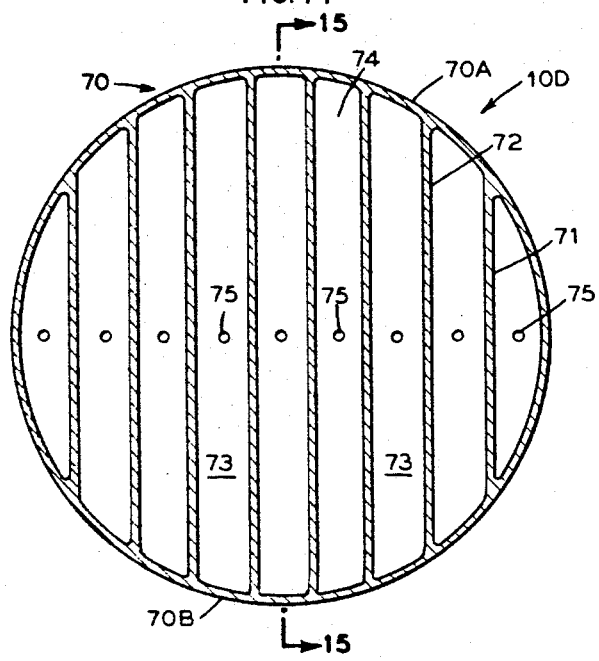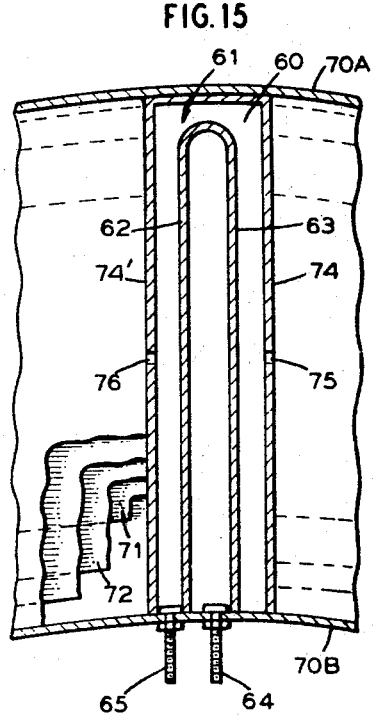

United States Patent Office 3,438,419
Patented Apr. 15, 1969

3,438,419
PUNCTURE RESISTANT INFLATABLE ARTICLES
Edmund C. Barbera, 55 Hillandale Road,
Port Chester, N.Y. 10918
Filed Nov. 10, 1966, Ser. No. 593,537
Int. Cl. B60c *17/00*
U.S. Cl. 152—338                                    1 Claim

ABSTRACT OF THE DISCLOSURE

A puncture resistant inflatable article such as a tire tube or the like, having multiple air chambers and inflating and sealing means for such chambers which takes the form of air supply conduits and sealing conduits located externally of the air chambers but in communication therewith, to thereby facilitate the manufacture of the article.

---

In applicant's copending application Ser. No. 453,437, filed May 5, 1965, now Patent No. 3,283,799, Nov. 8, 1966, there is set forth a multichamber inflatable article, wherein the puncture of one chamber does not materially affect the normal usage of the article. In said application, the chambers are inflated and sealed by means of a pair of coaxially related tubings which extend in an annular fashion through the radially disposed side walls of the sealed chambers. The tubings are arranged to form separate inflating and sealing conduits, each having its own valved air inlet.

The instant invention is an improvement in the inflating and sealing system for multichamber inflatable articles such as tire tubes, life jackets, rafts and the like.

Accordingly, an object of this invention is to provide in a multichamber inflatable article, inflating and sealing conduits so located in respect to the chambers as to materially simplify the fabrication of the article.

Another object of this invention is to provide an inflatable article of the character described, having improved individual chamber constructions.

A further object of this invention is to provide an improved puncture resistant inflatable article of a construction which materially reduces manufacturing costs and insures optimum usage.

Other objects of this invention will in part be obvious and in part hereinafter pointed out.

In the drawings, FIG. 1 is a side elevational view showing one embodiment of the invention, with parts broken away;

FIG. 2 is a top plan view of a portion thereof;

FIG. 3 is a sectional view taken on the line 3—3 of FIG. 4;

FIG. 4 is a sectional view taken on the line 4—4 of FIG. 3;

FIG. 5 is a view similar to that of FIG. 1, showing another embodiment of the invention;

FIG. 6 is a top plan view of a portion thereof;

FIG. 7 is a sectional view taken on the line 7—7 of FIG. 8;

FIG. 8 is a sectional view taken on the line 8—8 of FIG. 7;

FIG. 9 is a view similar to that of FIG. 1, showing a further embodiment of the invention;

FIG. 10 is a top plan view of a portion thereof;

FIG. 11 is a sectional view taken on the line 11—11 of FIG. 12;

FIG. 12 is a sectional view taken on the line 12—12 of FIG. 11;

FIG. 13 is a side elevational view with parts in section, showing a modified inflating and sealing assembly;

FIG. 14 is a transverse sectional view showing still another embodiment of the invention; and FIG. 15 is a sectional view taken on the line 15—15 of FIG. 14.

Essentially, the instant invention is concerned with an improved form of an inflating and sealing system for a puncture resistant inflatable article of the multichamber type. Thus, the inflating and sealing system takes the form of conduit portions which are externally related to the sealed chambers of the inflatable article.

Thus, as shown in FIGS. 1–4, 10 designates a multichamber inflatable article embodying the invention, and for the purpose of illustration takes the form of an annular member such as an automotive inner tube. The tube 10 is made up of a plurality of adjacent individually sealed chambers 11 defined by partitions 12 extending radially between an inner wall portion 13 and an outer wall portion 14. Each of the chambers 11 has an air inlet 15 formed in wall portion 13 thereof.

Means is provided for inflating and sealing the individual chambers 11. To this end, a chambered construction generally indicated at 16 and formed of flexible, resilient material, is mounted externally of chambers 11, being attached to the inner wall portion 13 thereof. Chamber construction 16 comprises a bottom wall 17 in annular form, side walls 18 locating bottom wall 17 in spaced relation to wall portion 13; and a partition wall 19 extending between side walls 18. Wall 19 in spaced relation to wall portion 13 forms therebetween an inflating conduit 20; and in spaced relation to wall 17 forms therebetween a sealing conduit 21.

The inlets 15 of chambers 11 communicate with inflating conduit 20. An air inlet valve 22 communicating at its inner end with conduit 20 and having its outer end passing through wall 17, permits air to be supplied by way of valve 22 and conduit 20 to each of the chambers 11 to inflate the same.

A second air inlet valve 23 is mounted on wall 17 for admitting air to sealing conduit 21, which is effective to press wall 19 tightly against wall portion 13 to thereby effectively seal the air inlets 15 therein. Thus, the individual chambers 11 are sealed and the puncture of any one chamber 11, will leave the remaining chambers inflated and unaffected.

The chambered sealing and inflating construction 16 is adapted to seat on a rigid support, such as the wheel rim of an automotive vehicle, not shown, upon which the tube 10 is mounted. The construction 16 by reason of its location relative to the chambers 11, facilitates the fabrication of tube 10 and insures optimum inflating and sealing operations.

In another embodiment of the invention, as shown in FIGS. 5–8, the inflatable inner tube 10A comprise an outer wall portion 25 and an inner wall portion 26 with radial partition walls 27 therebetween, to form chambers 28. A plurality of inflatable hollow bodies 29 fill each chamber 28, being disposed in radial relation within the chambers. Each of the bodies 29 has a necked air inlet portion 30 at the inner end thereof.

An annular air inflating and sealing assembly 31 is mounted on inner wall portion 26; the same comprising a wall 32 with side walls 33 locating the same in spaced relation to wall portion 26; and a partition wall 34 extending between side walls 33 and subdividing the space between wall 32 and wall portion 26 into an inflating conduit 35 and a sealing conduit 36.

The necked air inlet portions 30 of hollow bodies 29 are secured to wall portion 26 which is formed with openings 37 for affording communication between air inlet portions 30 and inflating conduit 35. An air inlet valve 38 is mounted on wall 34 and extends through wall 32 to admit air into conduit 35. A second air inlet valve 39 is mounted on wall 32 for admitting air into sealing conduit 36. Thus, the individual bodies 29 are inflated by way of valve 38 and then, wall 34 is pressed tightly against wall portion 26 to seal openings 37 when air is admitted to sealing conduit 36 by way of valve 39.

Still another embodiment of the invention is shown in FIGS. 9–12, wherein tube 10B comprises an outer wall portion 40 and an inner wall portion 41, forming a single annular chamber 42. Within chamber 42 are disposed a plurality of tubings 43 extending circumferentially thereof and substantially filling said chamber when inflated. The terminal ends 44 of tubings 43 at one end thereof are spaced from the terminal ends 45 of said tubings at the other end thereof, forming a radial chamber 46 therebetween which is defined by radial walls 47, 48 and a subdividing partition wall 49. Tubing terminal ends 45 are formed with air inlets 50 which register with openings 51 in chamber wall 48 and thus provide communication between tubings 43 and the air inflating chamber formed by walls 48, 49.

An air inlet valve 52 on inner wall portion 41 and communicating with the air inflating chamber 53, allows air to be supplied to tubings 43 to inflate the same. Walls 47, 49 form a sealing chamber 54 therebetween and a second air inlet valve 55 on wall portion 40 and communicating with chamber 54, is effective to admit air to said chamber 54 and thereby tightly press wall 49 against openings 51 in wall 48 to seal the inflated tubings 43. The puncture of one or more of the outermost tubings 43 will leave the remaining tubings inflated. The inner wall portion 40 of tube 10B may be positioned on the rigid rim of a wheel, not shown, on which tube 10B is to be mounted.

The tube 10B may be modified as shown at 10C in FIG. 13, wherein partition wall 49 is replaced by a bladder 61 located in radial chamber 60 with walls 62, 63 thereof located opposite radial walls 47, 48 respectively. A valve 64 in wall 41 admits air into bladder 61 while a valve 65 communicating with chamber 60 admits air therein for inflating tubings 43 via air inlet openings 51 on both walls 47 and 48. When bladder 61 is inflated, walls 62, 63 thereof effectively seal the openings 51 on walls 47, 48.

As shown in FIGS. 14, 15, tube 10D comprising top wall portion 70A and bottom wall portion 70B, with parallel partition walls 71, 72, etc. therebetween, forms circumferentially extending chambers 73 which are sealed off by transverse walls 74, 74′, formed with air inlet openings 75, 76. Bladder 61 in radial space 60 between walls 74, 74′ acts to seal openings 75, 76 via valve 64, chambers 73 being inflated via valve 65.

What is claimed is:

1. An inflatable article comprising a plurality of flexible walled, inflatable sealed chambers in adjacent relation to each other, said chambers having laterally releated wall portions formed with a plurality of air inlet openings respectively communicating with the interior of said chambers, inflating conduit means in opposed relation to said laterally related chamber wall portions, the inlet openings of said chambers communicating with said inflating conduit means, sealing conduit means in opposed relation to said inflating conduit means, valved air inlet means on each of said conduit means for independently admitting air to said inflating and sealing conduit means, the admission of air to said sealing conduit means being operative to collapse said inflating conduit means to seal said air inlet openings on said sealed chambers, each sealed chamber comprising a pair of opposed side walls and a wall in opposed relation to said wall portions, each of said side walls being common to a pair of adjacent chambers, and the wall portion of said chamber has a plurality of air inlet openings, and a plurality of inflatable bodies within each chamber, each of said bodies having an inlet passage in communication with one of said air inlet openings.

References Cited

UNITED STATES PATENTS

| | | | |
|---|---|---|---|
| 498,373 | 5/1893 | Williams | 152—337 |
| 551,471 | 12/1895 | O'Neill et al. | 152—337 |
| 1,362,187 | 12/1920 | Richards | 152—337 |
| 1,384,134 | 7/1921 | Jackson | 152—337 X |

ARTHUR L. LA POINT, *Primary Examiner.*